United States Patent [19]

Miyamoto et al.

[11] Patent Number: 4,795,781
[45] Date of Patent: Jan. 3, 1989

[54] RESIN COMPOSITION OF A SAPONIFIED ETHYLENE VINYL ACETATE COPOLYMER AND A POLYAMIDE RESIN

[75] Inventors: Masaaki Miyamoto; Eiichi Kamoshida, both of Kitakyushu; Hiroshi Takida, Osaka, all of Japan

[73] Assignees: Mitsubishi Chemical Industries Limited, Tokyo; Nippon Gohsei Kagaku Kogyo Kabushiki Kaisha, Osaka, both of Japan

[21] Appl. No.: 884,068

[22] Filed: Jul. 10, 1986

[30] Foreign Application Priority Data

Jul. 22, 1985 [JP] Japan .................................. 60-161591

[51] Int. Cl.$^4$ ........................ C08L 29/04; C08L 77/00
[52] U.S. Cl. ........................................ 525/58; 525/183
[58] Field of Search ............................. 525/58, 183

[56] References Cited

U.S. PATENT DOCUMENTS

| | | | |
|---|---|---|---|
| 3,636,136 | 1/1972 | Konopik | 525/58 |
| 4,347,332 | 8/1982 | Odorzynski et al. | 525/58 |
| 4,427,825 | 1/1984 | Degrassi et al. | 525/58 |

FOREIGN PATENT DOCUMENTS 54-78748  6/1979  Japan .
54-78750  6/1979  Japan .

*Primary Examiner*—John C. Bleutge
*Assistant Examiner*—A. Carrillo
*Attorney, Agent, or Firm*—Oblon, Fisher, Spivak, McClelland & Maier

[57] ABSTRACT

A moldable resin composition comprising (1) a saponified ethylene/vinyl acetate copolymer having an ethylene content ranging from 20 to 80 mole % and a saponification degree of not less than 90%, and a polyamide resin containing terminal carboxyl (—COOH) and terminal amide (—CONRR') groups, wherein the number (A) of the terminal carboxyl groups and the number (B) of terminal amide groups satisfies the relationship:

$$\frac{(B)}{(A) + (B)} \times 100 \geq 5$$

wherein (R) is a hydrocarbyl group of 1 to 22 carbon atoms and R' is a hydrogen atom or a hydrocarbyl group of 1 to 22 carbon atoms.

11 Claims, No Drawings

RESIN COMPOSITION OF A SAPONIFIED ETHYLENE VINYL ACETATE COPOLYMER AND A POLYAMIDE RESIN

BACKGROUND OF THE INVENTION

The present invention relates to a resin composition for molding, which comprises a saponified copolymer of ethylene and vinyl acetate, and a polyamide resin.

Since the composition comprising a saponified copolymer of ethylene and vinyl acetate, and a polyamide has useful properties of oxygen gas-barrier, oil-resistance and solvent-resistance due to the saponified copolymer and in addition, impact-resistance due to the polyamide, the melt-molded articles of the composition are used in various purposes including films, sheets and containers for packaging foodstuffs.

In literatures, for instance, molded articles comprising a saponified copolymer of ethylene and vinyl acetate, and nylon 6 or nylon 66 is disclosed in Japanese Patent Publication No. 44-24277 (1969).

However, in the case of carrying out the melt-molding of the above-mentioned resin composition for a long time, gel is generated in the molten resin, and/or dregs of the resin are accumulated in the screw part and the outlet of the extruder resulting in the damage of the physical properties of the molded articles or in the discontinuance of the molding operation due to the clogging of the screen and the nozzle of the extruder. In such a case, it is inevitable to take the extruder to pieces for removing the adhered dregs, and such an additional operation has a tendency of impairing the long-run processability in view of the efficiency of molding operation.

Although, in order to solve the above-mentioned demerit, a method of improving the long-run property by using a modified polyamide through copolymerization has been proposed in Japanese Patent Applications Laying-Open (KOKAI) No. 54-78749 (1979) and No. 54-78750 (1979), the continuous melt-molding operation of only several tens of hours becomes possible by the method thereof.

Obviously, in industrial scale operations, the longer a continuous melt-molding operation can be conducted, the more profitable the operation becomes.

As a result of the present inventors' studies for solving the above-mentioned problem, it has been found that a resin composition comprising (1) a saponified copolymer of ethylene and vinyl acetate, and (2) a polyamide resin which fulfills the following formula:

$$\frac{(B)}{(A) + (B)} \times 100 \geqq 5$$

wherein (A) is the number of terminal carboxyl groups (—COOH) and (B) is the number of terminal groups represented by the formula: —CONRR' wherein R is a hydrocarbyl group having 1 to 22 carbon atoms and R' is a hydrogen atom or a hydrocarbyl group haivng 1 to 22 carbon atoms, has excellent long-run processability characteristics during melt-molding, and because of this excellent long-run processability feature, problems are avoided such as gel formation and the adherence of dregs with the result that molded articles of excellent physical properties can be continuously produced.

SUMMARY OF THE INVENTION

In an aspect of the present invention, there is provided a resin composition comprising (1) a saponified copolymer of ethylene and vinyl acetate, and (2) a polyamide resin which fulfills the following formula:

$$\frac{(B)}{(A) + (B)} \times 100 \geqq 5$$

wherein (A) is the number of terminal carboxyl groups and (B) is the number of terminal groups represented by the formula: —CONRR', wherein R represents a hydrocarbyl group having 1 to 22 carbon atoms and R' represents a hydrogen atom or a hydrocarbyl group having 1 to 22 carbon atoms.

DETAILED DESCRIPTION OF THE INVENTION

In the present invention, the saponified copolymer of ethylene and vinyl acetate containing 20 to 80 mol %, preferably 25 to 60 mol % of ethylene units and having not lower than 90%, preferably not lower than 95% of saponification degree of vinyl acetate unit may be exemplified.

In the case where the ethylene content is below 20%, the oxygen-barrier property under high humidity condition is poor, and on the other hand, in the case where the ethylene content is over 80%, the physical properties such as oxygen gas-barrier property and printability are poor. In addition, in the case where the saponification degree is below 90%, the oxygen gas-barrier property and the moisture-resistance are poor.

Further, from the view-point of the mechanical strength of the molded articles, the saponified copolymer of ethylene and vinyl acetate having the intrinsic viscosity (of an 15% phenol-containing aqueous solution at 30° C.) of 0.7 to 1.5 dl/g, preferably 0.8 to 1.3 dl/g are suitably used.

In addition, in the case of producing the saponified copolymer of ethylene and vinyl acetate, as a comonomer a small amount of an α-olefin such as propylene, isobutene, α-octene, α-dodecene, α-octadecene, etc., an unsaturated carboxylic acid, a salt thereof, partially alkylated ester thereof, completely alkylated ester thereof, nitrile thereof, amide thereof, anhydride thereof, an unsaturated sulfonic acid and a salt thereof may be used.

In the polyamide resin used in the present invention, the number of terminal carboxyl groups (—COOH), and the number of the terminal group represented by the formula —CONRR' wherein R is a hydrocarbyl group having 1 to 22 carbon atoms and R' is a hydrogen atom or a hydrocarbyl group having 1 to 22 carbon atoms are in the following relation:

$$\frac{(B)}{(A) + (B)} \times 100 \geqq 5$$

wherein A is the number of terminal carboxyl groups and (B) is the number of terminal groups represented by the formula —CONRR'.

Namely, the polyamide resin has been obtained by the N-substituted amide modification of the terminal carboxyl group of the polyamide obtained by polymerization of a lactam having a ring of not less than three members or ε-amino acid, or copolymerization of a dibasic acid and a diamine, etc. Ordinarily, the monosubstituted amide modification (wherein R' is a hydrogen atom) is practical, the disubstituted amide modification may be usable.

In order to produce the polyamide resin according to the present invention, the raw material of the polyamide is subjected to polycondensation in the presence of (1) a monoamine having 1 to 22 carbon atoms or (2) a monoamine having 1 to 22 carbon atoms and a monocarboxylic acid having 2 to 23 carbon atoms.

As the raw material of the polyamide, lactams such as ε-caprolactam, enantholactam, capryllactam, lauryllactam, α-pyrrolidone and α-piperidone, ω-amino acids such as 6-aminocaproic acid, 7-aminoheptanoic acid, 9-aminononanoic acid and 11-aminoundecanoic acid, dibasic acids such as adipic acid, glutaric acid, pimelic acid, suberic acid, azelaic acid, sebacic acid, undecanedioic acid, dodecanedioic acid, hexadecanedioic acid, hexadecanedioic acid, eicosanedioic acid, eicosadienedioic acid, diglycolic acid, 2,2,4-trimethyladipic acid, xylylenedicarboxylic acid, 1,4-cyclohexanedicarboxylic acid, terephthalic acid and isophthalic acid, and diamines such as hexamethylenediamine, tetramethylenediamine, nonamethylenediamine, undecamethylenediamine, dodecamethylenediamine, 2,2,4- or 2,4,4-trimethylhexamethylenediamine, bis-(4,4'-aminocyclohexyl)methane, and methacylylenediamine may be mentioned.

As the monoamine having 1 to 22 carbon atoms, aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine and docosylamine, cycloaliphatic monoamines such as cyclohexylamine and methylcyclohexylamine, aromatic monoamines such as benzylamine and β-phenylethylamine, symmetric secondary amines such as N,N-dimethylamine, N,N-diethylamine, N,N-dipropylamine, N,N-dibutylamine, N,N-dihexylamine, N,N-dioctylamine and N,N-didecylamine, and mixed-type secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, N-methyl-N-cyclohexylamine and N-methyl-N-benzylamine may be mentioned.

Further, as the monocarboxylic acid having 2 to 23 carbon atoms, aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleinic acid, palmitic acid, stearic acid, oleic acid, linoleic acid, arachic acid and behenic acid, cycloaliphatic monocarboxylic acids such as cyclohexanecarboxylic acid and methylcyclohexanecarboxylic acid and aromatic monocarboxylic acids such as benzoic acid, toluic acid, ethylbenzoic acid and phenylacetic acid may be mentioned.

In addition, if necessary, other than the above-mentioned monoamine or a monoamine and a monocarboxylic acid, diamines, namely, aliphatic diamines such as ethylenediamine, trimethylenediamine, tetramethylenediamine, pentamethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine and 2,2,4- or 2,4,4-trimethylhexamethylenediamine, cycloaliphatic diamine such as cyclohexanediamine, methylcyclohexanediamine and bis-(4,4'-aminocyalohexyl)methane and aromatic diamines such as xylylenediamine; and dicarboxylic acids, namely, aliphatic dicarboxylic acids such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, hexadecanedioic acid, hexadecenedioic acid, octadecanedioic acid, octadecenedioic acid, eicosanedioic acid, eicosenedioic acid, docosanedioic acid and 2,2,4-trimethyladipic acid, cycloaliphatic dicarboxylic acids such as 1,4-cyclohexanedicarboxylic acid and aromatic dicarboxylic acid such as terephthalic acid, isophthalic acid, phthalic acid and xylylenedicarboxylic acid may be brought into coexistence.

In order to produce the polyamide resin according to the present invention, the above-mentioned raw material of the polyamide may be reacted by a conventional method, and the above-mentioned carboxylic acid and amine may be added to the reaction system in an optional stage during the time from the beginning of the reaction to the beginning of the reaction under a reduced pressure. In addition, the carboxylic acid and the amine may be added simultaneously or separately.

The amounts of the carboxylic acid and the amine used in the reaction are, as the amounts of the carboxylic group and the amino group, 2 to 20 meq/mol, preferably 3 to 19 meq/mol to one mol of the raw material of the polyamide (one mol of the monomer or the monomer unit), respectively (the amount of the amino group which reacts with the one equivalent of the carboxylic acid in the ratio of 1:1 to form an amido bond is defined as one equivalent).

In the case where each amount of the carboxylic acid and the amine is too small, it is impossible to produce the polyamide resin which has the effect of the present invention, and on the other hand, in the case where the amount thereof is too large, it is difficult to produce a polyamide of high viscosity, the result of which is that the physical properties of the polyamide resin are adversely affected.

In addition, it is preferable to carry out the reaction under the conditions so that the pressure at the final stage of the reaction becomes not more than 400 Torr, preferably not more than 300 Torr. In the case where the pressure at the final stage of the reaction is over 400 Torr, it is impossible to obtain the polyamide resin of the desired relative viscosity.

The reaction under a reduced pressure is preferably carried out for not less than 0.5 hour, ordinarily 1 to 2 hours.

As the hydrocarbyl group possessed by the polyamides resin according to the present invention at the terminal thereof and represented by R or R', aliphatic hydrocarbon groups such as methyl group, ethyl group, propyl group, butyl group, pentyl group, hexyl group, heptyl group, octyl group, 2-ethylhexyl group, nonyl group, decyl group, undecyl group, dodecyl group, tridecyl group, tetradecyl group, tetradecylene group, pentadecyl group, hexadecyl group, heptadecyl group, octadecyl group, octadecylene group, eicosyl group and dococyl group, cycloaliphatic hydrocarbon groups such as cyclohexyl group, methylcyclohexyl group and cyclohexylmethyl group and aromatic hydrocarbon groups such as phenyl group, toluyl group, benzyl group and β-phenylethyl group may be mentioned.

Although the conversion rate of the terminal —COOH group of the polyamide resin according to the present invention into the —CONRR' group is adjusted by bringing the amine or the amine and the carboxylic acid into coexistence in the time of producing the polyamide resin, the conversion degree is so that not less than 5 mol %, preferably not less than 10 mol % of the —COOH groups are converted to the —CONRR' group, and it is preferable that the amount of the —COOH groups not converted is not more than 50 μeq/g. polymer, preferably not more than 40μeq/g. polymer. In the case where the conversion degree is below 5 mol %, the effect of the present invention cannot be expected, and on the other hand, in the case where the conversion degree is too large, although there is no inconvenience in the physical property of the polyamide resin, the production becomes difficult. Accordingly, it is advisable to stop the conversion reaction to the extent that the amount of the unconverted terminal carboxylic group is 1 μeq/g. polymer.

The hydrocarbon groups represented by R and R' of the —CONRR' group are determined by gas-chromatography after hydrolyzing the polyamide resin by using hydrochloric acid, and the —COOH group is determined by dissolving the polyamide resin in benzyl alcohol and then titrating the solution with an aqueous 0.1N solution of sodium hydroxide.

As the terminal groups of the polyamide, resin according to the present invention, other than the —CONRR' groups, there are the —COOH groups and the —NH$_2$ groups derived from the raw material of the polyamide.

Concerning the terminal amino groups, there is no difficulty if it is modified or it is not modified, however, it is preferable that the terminal amino group is modified by the hydrocarbon group because of the improved fluidity and the thermal stability of the molten resin composition.

The amino group (—NH$_2$) is determined by dissolving the polyamide resin in phenol and titrating the thus formed solution by an aqueous 0.05N solution of hydrogen chloride.

The relative viscosity [ηrel] of the polyamide resins according to the present invention is 2 to 6 as the value determined in a 1% solution in 98% sulfuric acid at a temperature of 25° C. following the method disclosed in Japanese Industrial Standards (JIS) K 6810, preferably 2 to 5. In the case where the relative viscosity is too small it is difficult to prepare the strands of the resin and to chip the thus prepared strands resulting in the inconvenience of processing, and on the other hand, in the case where the relative viscosity is too high, the processability of the resin in melting-molding is poor.

The compounding ratio of the saponified copolymer of ethylene and vinyl acetate (i) and the polyamide resin (ii) is ordinarily suitable that the weight ratio of (i) to (ii) is from 98:2 to 2:98, preferably from 95:5 to 10:90.

In the case where the weight ratio is over 98:2, the effect of the saponified copolymer of ethylene and vinyl acetate in improving the physical properties such as impact strength of the molded articles produced from the mixture is not observed, and on the other hand, in the case where the weight ratio is below 2:98, the effect of the polyamide resin in improving the oxygen gas-barrier property of the molded articles produced from the mixture of the saponified copolymer of ethylene and vinyl acetate and the polyamide resin is not observed.

The resin composition according to the present invention (hereinafter referred to as the present composition) is molded into pellets, films, sheets, containers and rods by melt-molding. As the method of melt-molding, a known melt-molding method such as extrusion-molding, blow-molding, injection-molding, etc. is applicable. The temperature of melt-molding of the present composition is selected in the range of 150° to 270° C., and more in detail, the temperature of the outlet of the extruder can be selected in the range of 200° to 240° C. and the temperature of the compressing part of the screw of the extruder can be selected in the range of 180° to 230° C.

Into the present composition, well known additives such as various stabilizers, fillers, pigments, dyestuffs, lubricants, agents for preventing blocking and various thermoplastic resins may be added without any inconvenience.

In the present invention, by the use of, as a polyamide resin, the resin in which the terminal carboxylic group has been modified into N-substituted carboxylic amide group, in the case of melt-molding the mixture of the resin with a saponified copolymer of ethylene and vinyl acetate, the troubles of gel formation and of viscosity increasing are not caused even in the case of continuing the molding operation for a long time of at least 60 days.

Namely, the present composition is excellent in stability in a molten state and in addition, the molded articles obtained from the present composition are excellent in the mechanical specificities and the oxygen gas-barrier property.

The present invention will be explained more concretely while referring to the non-limitative Examples including Preparative Example and Comparative Examples as follows.

PREPARATION EXAMPLE

1. Production of the polyamide resins

By the following process, 6 kinds of the polyamide resins were produced.

In a 200-liter autoclave, 60 kg of ε-caprolactam, 1.2 kg of water, an amount of an amine (shown in Table 1) and an amount of a carboxylic acid (shown in Table 1) were introduced, and after changing the atmosphere in the autoclave into nitrogen gas, the autoclave was closed and heated to 260° C. to react the content of the autoclave for 2 hours under a pressure while stirring. Thereafter, the pressure of the autoclave was slowly released to a level shown in Table 1, and the reaction was carried out for 2 hours under a reduced pressure. After re-charging the autoclave with nitrogen gas to ordinary pressure, the stirring was stopped, and the reaction product was taken out from the autoclave as strands, and after chipping the strands and removing the unreacted monomer from the chips by boiling water, the chips were dried to obtain the polyamide resins.

The relative viscosity, the amount of the terminal carboxyl group (—COOH), the amount of the terminal amino group (—NH$_2$) and the following ratio of the thus obtained polyamide resins are shown in Table 1:

$$\frac{(B)}{(A) + (B)} \times 100 \text{ (in \%)}$$

wherein (A) is the number of the terminal carboxyl groups (—COOH) and (B) is the number of the terminal —CONRR' groups.

TABLE 1

| Item | N-1 | N-2 | N-3 | N-4 | N-5 | N-6 (Comparative Example) |
|---|---|---|---|---|---|---|
| Terminal —COOH group (μeq/g · polymer) | 20 | 9 | 20 | 26 | 30 | 84 |
| Terminal —NH₂ group (μeq/g · polymer) | 21 | 68 | 21 | 25 | 31 | 42 |
| $\frac{(B)}{(A)+(B)} \times 100$ | 60 | 87 | 80 | 64 | 10 | 0 |
| Relative viscosity [ηrel] | 2.89 | 2.40 | 2.50 | 2.22 | 3.61 | 2.49 |
| Kind of monoamine | Octadecylamine | Octadecylamine | Octadecylamine | Octadecylamine | Octadecylamine | None |
| Amount of monoamine (meq/mol) | 3.39 | 6.78 | 8.71 | 5.31 | 0.45 | 0 |
| Kind of carboxylic acid | Stearic acid | None | Adipic acid | Acetic acid | Stearic acid | Acetic acid |
| Amount of carboxylic acid (meq/mol) | 3.39 | 0 | 8.81 | 5.30 | 0.45 | 4.76 |
| Pressure of the final stage of polymerization (Torr) | 200 | 180 | 200 | 270 | 330 | 690 |

2. Preparation of the saponified copolymer of ethylene and vinyl acetate

Four kinds of the saponified copolymers of ethylene and vinyl acetate were prepared as are shown in Table 2.

TABLE 2

| Items | E-1 | E-2 | E-3 | E-4 |
|---|---|---|---|---|
| Content of ethylene units (mol %) | 36 | 28 | 43 | 39 |
| Saponification degree of vinyl acetate units (mol %) | 99.3 | 98.9 | 99.5 | 99.4 |
| Intrinsic viscosity (dl/g) | 0.78 | 0.78 | 0.90 | 0.76 |

EXAMPLES 1 to 14 and COMPARATIVE EXAMPLES 1 to 2:

Samples of each of the six polyamide resins and four saponified ethylene-vinyl acetate copolymers shown in Table 3 were pelletized. Compositions were prepared by mixing a pelletized polyamide resin with a pelletized saponified copolymer in a Henschel mixer. Each of the thus prepared mixtures was supplied to an extruder provided with a T-die to prepare a film of 20 μm in thickness by melt-blending, extruding and molding, the conditions of the above-mentioned operation being as follows.

Extruder: diameter of cylinder 40 mm, provided with a screw of 40 r.p.m.

Temperature: 230° C. in the extruder and 240° C. at the die

The results of the melt-molding are shown in Table 3.

TABLE 3

| | Resin material | Compounding ratio (E/N) | Days of continuous operation | Physical property of film*¹ |
|---|---|---|---|---|
| Examples | | | | |
| 1 | E-1 and N-1 | 9:1 | 60 days*² | 80 |
| 2 | E-2 and N-2 | 8:2 | 60 days*² | 55 |
| 3 | E-3 and N-3 | 7:3 | 60 days*² | 30 |
| 4 | E-4 and N-4 | 6:4 | 60 days*² | 16 |
| 5 | E-1 and N-5 | 5:5 | 60 days*² | 9 |
| 6 | E-2 and N-1 | 4:6 | 60 days*² | 7 |
| 7 | E-3 and N-2 | 3:7 | 60 days*² | 4 |
| Comparative Example | | | | |
| 1 | E-1 and N-6 | 5:5 | *³ | 16 |

Notes:
*¹Anti-pinhole property, represented by the number of holes generated after 100 times of twisting the specimen to 400° (during 3.5 inches of straight passing) and passing 2.5 inches. In one case where only the pellets of the saponified copolymer of ethylene and vinyl acetate, E-1 were melt-extruded, the number of the pinholes on the thus obtained film was as large as 150.
*²Thereafter no abnormal finding was obtained.
*³Generation of gel was observed after 15 hours of operation and discoloration of the film was observed after 3 days' operation.

TABLE 4

| | Resin material | Compounding ratio (E/N) | Days of continuous operation | Physical property of Film*¹ |
|---|---|---|---|---|
| Example | | | | |
| 8 | E-1 and N-1 | 1:9 | 60 days*² | 52 |
| 9 | E-2 and N-2 | 1.5:8.5 | 60 days*² | 35 |
| 10 | E-3 and N-3 | 2:8 | 60 days*² | 48 |
| 11 | E-4 and N-4 | 2:8 | 60 days*² | 43 |
| 12 | E-1 and N-5 | 2:8 | 60 days*² | 38 |
| 13 | E-2 and N-1 | 2.5:7.5 | 60 days*² | 25 |
| 14 | E-3 and N-2 | 2.5:7.5 | 60 days*² | 30 |
| Comparative Example | | | | |
| 2 | E-1 and N-6 | 2:8 | *³ | 37 |

Notes:
*¹Permeability to gaseous oxygen, at 25° C. and RH of 75%, the unit being cc/m² · 24 hours · atm. In one case where only the pellets of the polyamides resin, N-6, were melt-extruded, the permeability of oxygen gas through the thus prepared film was 80 cc/m² · 24 hrs · atm.
*²Thereafter no abnormal finding was obtained.
*³Generation of gel was observed after 15 hours of operation and discoloration of the film was observed after 3 days' operation.

EXAMPLE 15

Into a 200 liter-autoclave, 83 kg of an aqueous 60% solution of hexamethylenediamine adipate were introduced, and while substituting the atmosphere of the autoclave with nitrogen gas and maintaining the inner pressure of the autoclave at 17.5 kg/cm²G, the inner temperature of the autoclave was raised to 260° C. After keeping the temperature for 1.5 hours, the pressure was slowly released, and when the pressure was reduced to 2.5 kg/cm²G, dodecylamine was introduced into the autoclave in an amount shown in Table 5, and the autoclave was maintained under the same conditions of the pressure and the temperature for 1.5 hours. Then, the pressure was released to the level shown in Table 5 to carry out the reaction under the released pressure for 1.5 hours. After introducing nitrogen gas into the thus operated autoclave. to recover the inner pressure of the autoclave to ordinary level, the stirring was stopped and the content of the autoclave was taken out as the strands. The thus obtained strands were chipped, and the chips were dried to obtain the polyamide resins.

The relative viscosity, the amount of the terminal carboxyl group (—COOH), the amount of the terminal amino wherein (A) group (—NH₂) and the value of $$\frac{(B)}{(A)+(B)} \times 100$$

wherein (A) is the number of the carboxyl group (—COOH) and (B) is the number of the —CONRR' group were determined and are shown in Table 5.

After pelletizing the thus obtained polyamide resin (N-7), the thus obtained pellets were blended with the pellets of the saponified copolymer of ethylene and vinyl acetate prepared in Preparation Example (E-1) at a mixing ratio of 1:9, and the thus obtained mixture of the pellets. was subjected to melt-molding in the same manner as in Example 1 to obtain a film to be evaluated, the results being shown in Table 6.

COMPARATIVE EXAMPLE 3

In the same manner as in Example 15 except for not introducing dodecylamine, a product was obtained, and after evaluating the physical properties thereof, the polyamide resin, N-8, was subjected to the same operation of blending and melt-molding as in Example 15 to obtain a film, the results of evaluation of the product and the film prepared from the product being also shown in Table 6 .

TABLE 5

| Item | Specimen N-7 | N-8 (Comparative Example) |
|---|---|---|
| Terminal —COOH group (μeq/g · polymer) | 26 | 57 |
| Terminal —NH₂ group (μeq/ g · polymer) | 50 | 26 |
| $\frac{(B)}{(A)\times(B)} \times 100$ | 24 | 0 |
| Relative viscosity [ηrel] | 2.79 | 3.09 |
| Kind of monoamine | Dodecylamine | None |
| Amount of monoamine (meq/mol) | 5.41 | 0 |
| Kind of carboxylic acid | None | None |
| Amount of carboxylic acid (meq/mol) | 0 | 0 |
| Pressure of the final stage of polymerization (Torr) | 250 | 450 |

TABLE 6

| | Resin material (Compounding ratio) | Days of continuous operation | Physical property (number of pinhole) |
|---|---|---|---|
| Example 15 | E-1 and N-7 (1:9) | 60 days*1 | 90 |
| Comparative Example 3 | E-1 and N-8 (1:9) | *2 | 100 |

Notes:
¹No abnormal finding was obtained thereafter.
²Generation of gel was observed after 24 hours of operation and discoloration of the film was observed after 3 days of operation.

What is claimed is:
1. A resin composition, comprising:
(1) a saponified ethylene/vinyl acetate copolymer having an ethylene content ranging from 20 to 80 mole % and a saponification degree of not less than 90%, and
(2) a polyamide resin containing terminal carboxyl (—COOH) and terminal amide (—CONRR') groups, wherein the number (A) of the terminal carboxyl groups and the number (B) of terminal amide groups satisifies the relationship:

$$\frac{(B)}{(A)+(B)} \times 100 \geqq 5$$

wherein R is a hydrocarbyl group of 1 to 22 carbon atoms and R, is hydrogen atom or a hydrocarbyl group of 1 to 22 carbon atoms.
2. The resin composition according to claim 1, wherein the weight ratio of said saponified copolymer (1) of ethylene and vinyl acetate to said polyamide resin (2) is 98:2 to 2:98.
3. The resin composition according to claim 1, wherein the intrinsic viscosity of said saponified copolymer of ethylene and vinyl acetate is 0.7 to 1.5 dl/g.
4. The resin composition according to claim 1, wherein the amount of said terminal carboxyl group of said polyamide resin is not more than 50 μeq/g-.polymer.
5. The resin composition according to claim 1, wherein the relative viscosity [ηrel] of said polyamide resins is
6. The resin composition according to claim 1, wherein the content of said ethylene units in said saponified polymer ranges from 25 to 60 mol %.
7. The resin composition according to claim 1, wherein the saponification degree of said saponified copolymer is not less than 95%.
8. The resin composition according to claim 1, wherein said saponified copolymer further comprises a minor amount of a comonomer which is an α-olefin, an unsaturated carboxylic acid, a salt thereof, a partially alklated ester of said unsaturated carboxylic acid, a completely alkylated ester of said unsaturated carboxylic acid, the nitrile derivative of said unsaturated carboxylic acid, an amide of said unsaturated carboxylic acid, an unsaturated carboxylic acid anhydride, an unsaturated sulfonic acid or a salt thereof.
9. The resin composition according to claim 1, wherein the terminal amide groups of said polyamide are prepared from a monoamine selected from the group consisting of methylamine, ehtylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine, docosylamine, cyclohexylamine, methylcyclohexylamine, benzylamine, and β-phenylethylamine.

10. The resin composition according to claim 1, wherein the terminal amide group is formed from a secondary amine reactant selected from the group consisting of N-N-dimethylamine, N,N-diethylamine, N,N-dipropylamine, N,N-dibutylamine, N,N-dihexylamine, N,N-dioctylamine, N,N-didecylamine, N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, N-methyl-N-cyclohexylamine and N-methyl-N-benzylamine.

11. The resin composition according to claim 10, wherein said polyamide is formed by polycondensation in the presence of a mixture of said monoamine and a monocarboxylic acid having from 2 to 23 carbon atoms selected from the group consisting of acetic acid, propionic acid, butyric acid, valeric acid, caproic acid, enanthic acid, caproylic acid, capric acid, pelargonic acid, undecanoic acid, lauric acid, tridecanoic acid, myristic acid, myristoleinic acid, palmitic acid, stearic acid, oleic acid, linoleic acid, arachic acid, behenic acid, cyclohexane carboxylic acid, methylkcyclohexanbe carboxylic acid, benzoic acid, toluic acid, ethylbenzoic acid and phenylacetic acid.

* * * * *